United States Patent [19]

Cohen

[11] Patent Number: 4,596,360
[45] Date of Patent: Jun. 24, 1986

[54] PILOT OPERATED PRESSURE REGULATING VALVE

[75] Inventor: Mordehy Cohen, Rockford, Ill.

[73] Assignee: Sunstrand Corporation, Rockford, Ill.

[21] Appl. No.: 686,304

[22] Filed: Dec. 26, 1984

[51] Int. Cl.[4] .......................................... G05D 27/00
[52] U.S. Cl. ................................ 236/92 R; 236/102;
251/61.4; 251/335.3; 251/61.2
[58] Field of Search .............. 236/92 R, 101 R, 102,
236/85; 251/61.2, 61.4, 335 B

[56] References Cited

U.S. PATENT DOCUMENTS

| | | |
|---|---|---|
| 1,925,301 | 9/1933 | Campbell . |
| 2,013,766 | 9/1935 | Sandvoss . |
| 2,484,848 | 10/1949 | Paget . |
| 2,520,216 | 8/1950 | Kounovsky et al. . |
| 2,687,868 | 8/1954 | Barrett et al. . |
| 2,919,102 | 12/1959 | Peters ................................ 251/61.2 |
| 2,974,944 | 3/1961 | Terp ............................ 236/92 R X |
| 3,053,281 | 9/1962 | Taylor ......................... 236/92 R X |
| 3,366,315 | 1/1968 | Alberani . |
| 3,447,746 | 6/1969 | Visos ................................ 236/102 X |
| 3,452,775 | 7/1969 | Alberani . |
| 3,578,014 | 5/1971 | Gachot . |
| 3,664,362 | 5/1972 | Weise . |
| 3,762,434 | 10/1973 | Allen et al. . |
| 3,772,534 | 3/1973 | Breunich et al. . |
| 3,881,505 | 5/1975 | Dunkelis . |
| 3,945,395 | 3/1976 | Reinicke et al. . |
| 4,172,466 | 10/1979 | Pattarini et al. . |
| 4,238,109 | 12/1980 | Powers . |
| 4,243,069 | 1/1981 | Piet et al. . |
| 4,390,041 | 6/1983 | Reip . |

Primary Examiner—William E. Tapolcai
Attorney, Agent, or Firm—Wood, Dalton, Phillips Mason & Rowe

[57] ABSTRACT

To eliminate the effect of variables such as pressure and temperature on the operation of a pilot operated, pressure regulating valve, a poppet (30) is disposed between two ports (20), (34) in a valve body (14) and is biased towards a seat (26) by a pair of bellows (50), (58) which in turn are selectively compressed by an elongated rod (68). The bellows (50), (58) are disposed in opposing relation and have their interiors vented to eliminate the effect of ambient pressure while the body (14) and the rod (68) are made of materials having differing coefficients of thermal expansion to provide for temperature compensation.

18 Claims, 2 Drawing Figures

SOURCE

POINT OF USE

PILOT OPERATED PRESSURE REGULATING VALVE

FIELD OF THE INVENTION

This invention relates to a pilot operated valve, and more specifically, to a pilot operated valve that may be employed in a pressure regulating system.

BACKGROUND OF THE INVENTION

Pilot operated valves have long been used in a variety of applications. One application is that of pressure regulation wherein it is desirable to control the output pressure from a valve as a function of the input presure of a pilot signal.

Most frequently, it is desirable to control the output pressure from the regulating valve as a straight line function of the input pilot signal. In making such a valve with straight line response, a problem is the inability to eliminate the effects of a variety of variables such as input fluid temperature, output fluid temperature, and ambient temperature. Ambient pressure may also affect the system.

Vibrational loads in the environment in which the valve is employed and manufacturing tolerances of the valve components represent still other variables.

At the same time, it is desirable to provide a construction wherein hysteresis losses are minimized and which provides for minimum leakage of the input pilot pressure. It is also desirable that the valve have rapid dynamic response and a construction in which the linear relation between the output pressure and the input pilot pressure may be changed as desired. It is also desirable to design the valve such that it cannot be damaged when subjected to abnormal operating pressures.

The present invention is directed to overcoming the above stated problems and accomplishing the stated objects.

SUMMARY OF THE INVENTION

It is the principal object of the invention to provide a new and improved pilot operated valve. More specifically, it is an object of the invention to provide a pilot operated valve which controls a pressure signal linearly in response to an input pressure signal and wherein the effects of environmental variables and manufacturing tolerances are minimized or eliminated. It is likewise an object of the invention to provide a pilot operated valve having minimum hysteresis losses and wherein leakage of input pilot pressure is minimized along with fast dynamic response, easy adjustability, and the ability to avoid damage when subjected to abnormally high pressures.

An exemplary embodiment of the invention achieves the foregoing objects in a pilot operated valve including a valve body with a cavity in the body. A valve seat is located in the cavity and a poppet is disposed in the cavity adjacent the seat and is moveable within the cavity toward and away from the seat. A first port extends to the cavity on one side of the poppet and a second port extends to the cavity on the other side of the poppet. One of the ports is adapted to be subjected to a fluid under a pressure greater than the other of the ports to bias the poppet toward the other port. Resilient compressible bellows are disposed within the cavity for biasing the poppet towards one of the ports and a rod is located within the cavity and cooperates with the bellows and the rod is securable to the body at a location remote from the seat in an adjustable fashion.

A third port extends to the cavity and is in fluid communication with the bellows and pressure isolated from the previously mentioned ports. Such third port is adapted to receive a fluid pressure signal to act on the bellows and alter the bias applied thereby to the poppet.

To achieve compensation for varying temperatures, the valve body and the rod are elongated and have differing coefficients of thermal expansion.

In a highly preferred embodiment, the bellows comprise first and second interengaging, but nonconnected sections. One of the bellows sections has a greater pressure effective area than the other and is so sized with respect to the other that when a fluid pressure signal in excess of a predetermined magnitude is received at the third port, the bellows sections will separate and be placed in compression to avoid damage thereto.

To minimize hysteresis loss, it is contemplated that the poppet engage the valve body only at the valve seat and otherwise be spaced in the walls of the cavity.

To assure alignment of the valve with the seat without requiring slidable guiding engagement of the same by other components, the bellows sections engage each other at self-aligning formations, one of which additionally engages the poppet.

More specifically, the poppet includes a stem terminating in a convex surface which is received in a concave spherical formation on one of the bellows. The opposite side of the concave spherical formation is, of course, convex and is received in a concave spherical formation on the other bellows, the latter concave spherical formation being of a radius slightly greater than the radius of the formation on the other bellows.

To eliminate the effects of ambient pressure, the bellows are located in opposition to each other and their interiors are both vented to the ambient.

To provide for adjustability, the rod is securable to the body by means of a chuck. The chuck provides a predominantly radial securing force on the rod to allow precision adjustability.

In a highly preferred embodiment, the rod is threadably received within the body and the chuck is operative to secure the rod in the body at any of a selected variety of threaded positions therein.

Other objects and advantages will become apparent from the following specification taken in connection with the accompanying drawings.

DESCRIPTION OF THE PREFERRED EMBODIMENT

Figures 1, 2:
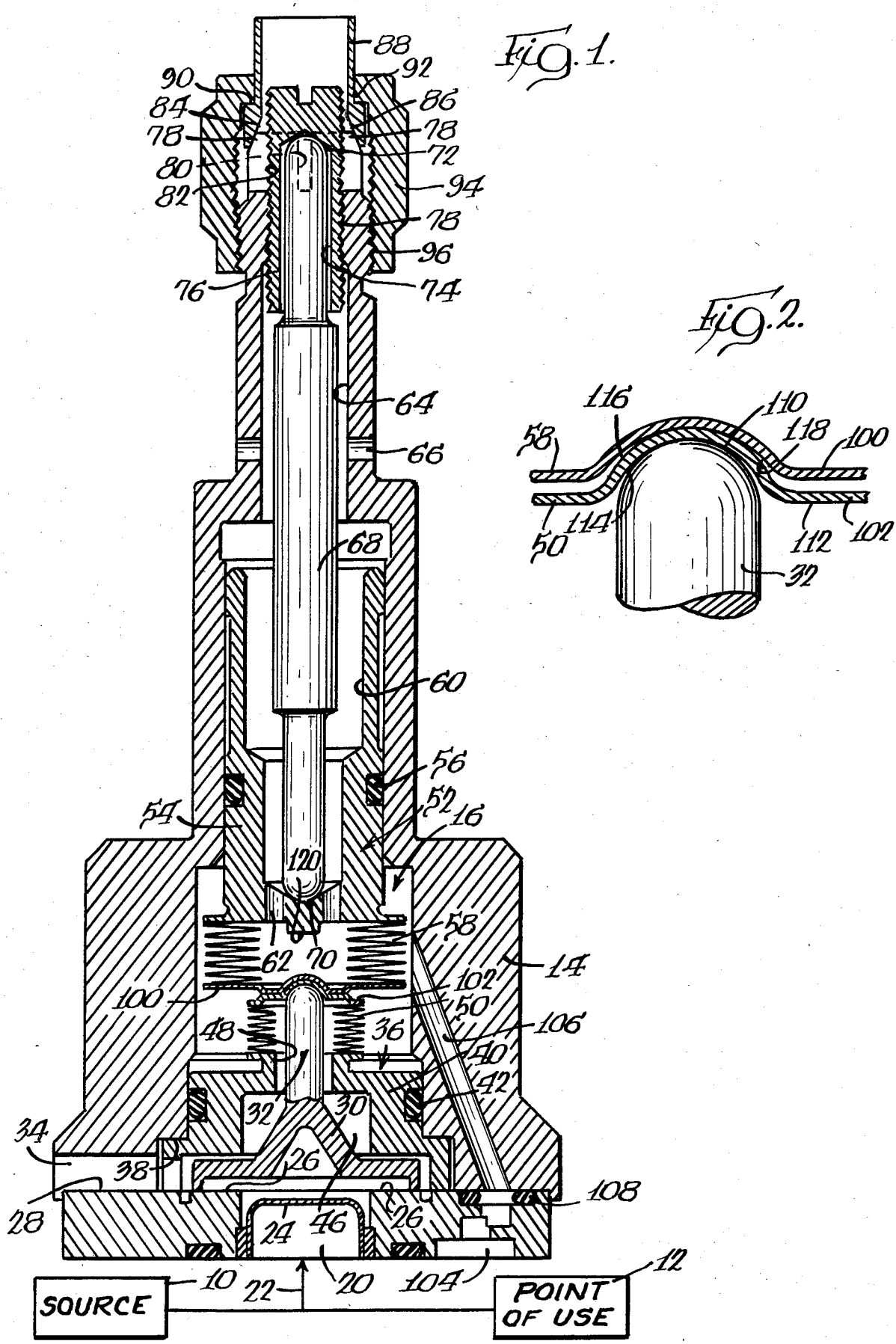
FIG. 1 is a sectional view of a valve made according to the invention.
FIG. 2 is an enlarged, fragmentary sectional view illustrating the relationship between two bellows at their point of engagement and the engagement of a poppet stem therewith.

An examplary embodiment of a pilot operated valve made according to the invention is illustrated in FIG. 1. The same is adapted to be subjected to fluid under pressure received from a source 10 and operatable to bleed off or vent pressure in excess of that required to perform some desired function at a point of use 12. The valve includes a body 14 having an interior cavity, generally designated 16, opening to one end of the body 14 which in turn is closed by a cap 18. The cap 18 includes a port 20 to which fluid under pressure from the source 10 is applied as indicated by an arrow 22. A screen 24 may be disposed within the port 20 to prevent contaminants from entering the valve.

An area 26 on a surface 28 of the cap 18 surrounding the port 20 acts as a valve seat which may be engaged by a poppet 30 received within the cavity 16. The poppet 30 includes a stem 32 which extends into the cavity 16 oppositely from the port 20.

The body 14, at a location adjacent the surface 28 of the cap 18 includes a port 34 which extends from the cavity 16 to the exterior of the body 14. It will be seen from FIG. 1 that pressurized fluid from the source 10 may be vented via the flow path from the port 20 through the cavity 16 to the port 34, subject to control by the poppet 30. Thus, by controlling the degree to which the poppet 30 opens, the pressure of the fluid ultimately received at the point of use 12 may be controlled.

A first bellows assembly, generally designated 36, is disposed within the cavity 16 and abuts a shoulder 38 of the body 14. The bellows assembly 36 includes a piston-like base 40 having an annular groove receiving an O-ring seal 42 which sealingly engages the wall of the cavity 16. The base 40 includes a central cavity 46 in which the poppet 30 is disposed in essentially nontouching relation. The cavity 46 terminates in a bore 48 of a diameter somewhat greater than that of the stem 32 which extends to the interior of a first bellows 50. It will be observed that the stem 32 extends through the bore 48 without touching the same and into the interior of the first bellows 50.

It will thus be appreciated that the interior of the first bellows 50 is in fluid communication with the vent port 34 via the bore 48, the cavity 46 and the cavity 16.

A second bellows assembly, generally designated 52, is also received in the cavity 16. The bellows assembly 52 includes a piston-like base 54 having an annular groove receiving an O-ring seal 56 which sealingly engages the wall of the cavity 16. At its end facing the first bellows 50, the base 54 mounts a second bellows 58 of larger diameter, and thus a greater pressure effective area, than the bellows 50. In contrast to the bellows assembly 36 which is held in place within the bore by abutment with the shoulder 38, the bellows assembly 52 is slidable within the cavity 16 toward and away from the port 20.

The base 54 includes a hollow interior 60 which, by means of passages 62, is in fluid communication with the interior of the second bellows 58. The hollow interior 60 opens to the cavity 16 near the end thereof remote from the port 20. The body 14 includes a reduced diameter bore 64 extending to the cavity 16 which is vented by ports 66. Thus, the interior of the second bellows 58 is vented to ambient via the passages 62, the hollow interior 60, the reduced diameter bore 64 and the vent ports 66.

An elongated rod 68 extends through the reduced diameter bore 64 into the cavity 16 as well as the hollow interior 60 of the base 54 to engage the latter at a location in axial alignment with the poppet stem 32. The rod 68 terminates in a spherical end 70.

The opposite end 72 of the rod 68 is likewise spherical and is received in a bore 74 in a screw 76 threaded as at 78 into the body 14 at the end thereof remote from the port 20.

Thus, by rotating the screw 78, the axial position of the rod 68 within the body 14 may be adjusted as desired.

The upper end of the body 14 terminates in a plurality of fingers 78 separated by axially extending slots 80. The fingers 78 have threaded interior surfaces 82 in engagement with the screw 78 and frusto-conical outer surfaces 84 in engagement with a mating frusto-conical surface 86 on the interior of a sleeve 88 having a larger interior diameter than that of the screw 76. The sleeve 78 also includes a radially outwardly extending annular shoulder 90 which is engaged by a radially inwardly directed shoulder 92 of a nut 94 threaded as at 96 to the body 14 remote from the poppet 20. This structure acts as a chuck to assure that the rod 68 is maintained in a desired axial position within the body 14. In particular, the nut 94 may be loosened and the screw 76 turned to achieve a desired axial position of the rod 68. At this time, the nut 94 may be again tightened. The interengagement of the shoulders 90 and 92 will cause the sleeve 88 to be driven downwardly as viewed in FIG. 1. The frusto-conical surfaces 86 of the sleeve 88 will act against the frusto-conical surface 84 of the fingers 78 to drive the same radially inwardly to tighten the engaged screw 76. Because the gripping movement of the fingers 78 is predominantly in the radial direction, it will be appreciated that the axial position of the screw 76, and thus the rod 68, will not be changed during the tightening of the nut 94, thereby preserving the initial axial position achieved by rotation of the screw 76.

This feature of the invention is employed to preload or set the original bias applied to the poppet 30 in the direction of the seat 26. Specifically, it can be seen that the lower end 100 of the second bellows 58 engages the upper end 102 of the first bellows 50 which in turn is in engagement with the poppet stem 32. Thus, by axially advancing the rod 68 into the cavity 16, bellows 58 will be progressively more compressed applying a greater closing bias to the poppet 30.

The cap 18 also includes a port 104 in fluid communication with a passageway 106 in the body 14 which extends to the cavity 16 at a location between the bases 40 and 54 of the bellows assemblies 36 and 52. An O-ring seal 108 seals the interface of the cap 18 and the body 14 about the passageway 106.

It will thus be appreciated that a pilot signal applied to the port 104 will act against the exterior of both the bellows 50 and 58 to cause the same to tend to collapse, that is, go into compression. Consequently, the greater magnitude of the pilot signal applied to the port 104, the lesser the loading on the poppet 30 toward the closed position provided by the bellows 50 and 58.

As can be seen in FIG. 1, the poppet 30 and stem 32 do not engage any other components in the system other than the seat 28 and the underside of the top 102 of the bellows 50. The purpose of this construction is to minimize hysteresis loss which would be caused by sliding engagement with guides and the like.

To assure that the poppet 30 is properly aligned with the seat 26, the upper end of the stem 32 is made spherical as shown in FIG. 2 at 110. The underside 112 of the top 102 of the bellows 50 is provided with a concave spherical recess 114 of a slightly greater diameter than the spherical end 110 of the stem 32. As a consequence, the recess 114 serves as a self-aligning formation for aligning the stem 32, and thus the poppet 30 with the seat 26. The use of spherical surfaces allows the poppet 30 to cock slightly in relation to the seat 26 for less than fully open conditions and yet assures that the biasing force applied to the poppet 30 from the bellows 50 and 58 will be directed axially.

Oppositely of the recess 114, the upper end 102 of the bellows 50 has a convex spherical formation 116 which in turn is received in a concave spherical formation 118 in the lower end 100 of the bellows 58. The radius of the formation 116 is slightly less than the radius of the formation 118.

As a result of the foregoing construction, there will be essentially point contact between the bellows 50 and 58 and between the bellows 50 and the stem 32 to provide the aligning function mentioned previously. This avoids frictional losses to enhance response and avoid frictions as a variable in the response of the valve to a pressure signal.

As can be seen in FIG. 2, the bellows 50 and 58 engage each other but are not connected to each other. As a consequence, at some magnitude of a pilot pressure signal applied to the port 104, the bellows 50 and 58 may actually separate from each other as they are placed under increasing compression by such signal. Excessive compression of the bellows 50 under such circumstance is prevented by reason of the stop action limiting such compression provided by the stem 32 when the poppet 30 is bottomed against the seat 26. The bellows 58 may compress substantially but to limit compressive action, a surface 120 on the base 52 within the interior of the bellows 58 is positioned to engage the lower end 100 thereof oppositely of the formation 118 to limit further compressive movement.

It will be observed that if the bellows 50 and 58 were rigidly interconnected to each other, under such circumstance, because of the greater pressure effective area of the bellows 58, the bellows 50 could conceivably be placed in tension to the point where the elastic limit of the material of which it is made would be exceeded. Consequently, the valve would no longer respond in the desired fashion. By means of the just described structure, this difficulty is avoided.

In order to provide temperature compensation, it is preferred that the body 14 be elongated along with the rod 68. Typically, for an increasing temperature, the modulus of elasticity of the material of which the bellows 50 and 58 are made, which may be a conventional material, will decrease thereby reducing the loading of the poppet 30 towards the seat 26. To compensate for this change, the body 14 may be made of a material having a relatively low coefficient of thermal expansion while the rod 68 may be made of a material having a relatively greater coefficient of thermal expansion. Thus, upon increasing temperature, the length of the rod 68 will increase more rapidly than the length of the body 14 causing the base 52 to move somewhat downwardly within the cavity 16 from the position shown applying an increasing, compensating compressive force on the bellows 58 and on the bellows 50 by reason of their engagement. By appropriate dimensioning of the components and choosing of the coefficients of thermal expansion, the increase of the compression of the bellows 50 and 58 caused by thermal expansion of the rod 68 relative to the body 14 can be made to offset, to any desired degree, the decrease in the loading applied to the poppets 30 as a result of the decreasing modulus of elasticity of the bellows 50 and 58 as temperature rises.

It will also be appreciated that a valve made according to the invention minimizes hysteresis losses since essentially the only moving parts are the poppet 30 and the bellows 50 and 58 which are free from sliding or rubbing contact with other components save for their essentially point contact with each other. This same feature maximizes dynamic response.

The unique configuration of seals minimizes the possibility of leakage of the pilot pressure applied to the port 104 thereby maximizing accurate response. The minimizing of leakage also conserves energy by lessening the load on the pump providing the pressurized pilot signal. The construction whereby the bellows 50 and 58 may separate in response to abnormally high pressures precludes damage to the regulating components of the valve that may occur in other constructions in the presence of such pressures.

Variations in manufacturing tolerances are easily compensated for by suitable adjustment of the axial position of the rod 68 utilizing the screw 76 and the chuck components mentioned previously. Additionally, because the interior of both of the bellows, which are in opposition to each other, are vented, the effects of ambient pressure changes are avoided. The construction also minimizes or eliminates the effects of vibration in the environment in which the valve is utilized.

I claim:

1. A pilot operated valve comprising:

an elongated valve body formed of a material having a first coefficient of thermal expansion;

an elongated cavity in said body;

a valve seat in said body adjacent one end of said cavity;

a poppet in said cavity adjacent said seat and movable within said cavity toward and away from said seat;

a first port to said cavity on one side of said poppet;

a second port to said cavity on the other side of said poppet;

one of said first and second ports adapted to be subjected to a fluid under a pressure greater than the other of said first and second ports to bias said poppet towards said other port;

resilient, compressible bellows within said cavity for biasing said poppet towards one of said ports;

an elongated rod of a material having a coefficient of thermal expansion different from that of said body disposed within said cavity and cooperating with said bellows to bias said poppet towards said one port;

one of said bellows and said rod being securable to said body remote from said seat; and a third port to said cavity in fluid communication with said bellows and pressure isolated from said first and second ports, said third port being adapted to receive a fluid pressure signal to act on said bellows and alter the bias applied thereby to said poppet.

2. The pilot operated valve of claim 1 wherein said bellows comprises first and second interengaging but nonconnected sections, one of said sections having a greater pressure effective area than the other and being so sized with respect to the other that when a fluid pressure signal in excess of a predetermined magnitude is received at said third port, said first and second sections will separate with each section being placed in compression.

3. The pilot operated valve of claim 2 wherein one of said sections, at an end thereof includes a convex spherical formation of first radius, and the other of said sections includes a mating concave spherical formation of a second radius slightly greater than said first radius, said convex formation being received in a concave formation.

4. The pilot operated valve of claim 3 wherein said formations are axially aligned with said rod.

5. The pilot operated valve of claim 4 wherein said third port is in fluid communication with the exterior of both said sections of said bellows, and the interior of both said sections of said bellows are in fluid communication with a common pressure source.

6. The pilot operated valve of claim 1 wherein said rod is securable to said body and engages said bellows, which in turn engages said poppet.

7. The pilot operated valve of claim 6 wherein said rod is securable to said body by a chuck located on said body oppositely of said seat, said chuck providing a predominantly radial securing force on said rod.

8. The pilot operated valve of claim 7 wherein said rod is threadbly received within said body and said chuck is operative to secure said rod in said body at any of a selected variety of threaded positions therein.

9. A pilot operated valve comprising:
a valve body;
a cavity in said body;
a valve seat in said body adjacent one end of said cavity;
a poppet in said cavity adjacent said seat and movable within said cavity toward and away from said seat;
a first port to said cavity on one side of said poppet;
a second port to said cavity on the other side of said poppet;
one of said first and second ports adapted to be subjected to a fluid under a pressure greater than the other of said first and second ports to bias said poppet towards said other port;
resilient, compressible bellows within said cavity for biasing said poppet towards one of said ports;
a rod within said cavity and engaging said bellows to bias said poppet towards said one port;
said rod being adjustably securable to said body remote from said seat; and
a third port to said cavity in fluid communication with said bellows and pressure isolated from said first and second ports, said third port being adapted to receive a fluid pressure signal to act on said bellows and alter the bias applied thereby to said poppet.

10. The pilot operated valve of claim 9 wherein the interior of said bellows is vented and said third port is in fluid communication with the exterior of said bellows.

11. The pilot operated valve of claim 9 wherein said other of said first and second ports is in fluid communication with the interior of said bellows to vent the same.

12. A pilot operated valve comprising:
a valve body;
a cavity in said body;
a valve seat in said cavity;
a poppet in said cavity adjacent said seat and movable within said cavity toward and away from said seat;
a first port to said cavity on one side of said poppet;
a second port to said cavity on the other side of said poppet;
one of said first and second ports adapted to be subjected to a fluid under a pressure greater than the other of said first and second ports to bias said poppet towards said other port;
a pair of resilient, compressible bellows within said cavity for biasing said poppet towards one of said ports, one of said bellows engaging said poppet, said bellows having differing pressure responsive areas;
a rod within said cavity and engaging the other of said bellows to bias said poppet towards one of said ports;
said rod being adjustably securable to said body at a location remote from said seat; and
a third port to said cavity in fluid communicatin with said bellows and pressure isolated from said first and second ports, said third port being adapted to receive a fluid pressure signal to act on said bellows and alter the bias applied thereby to said poppet.

13. The pilot operated valve of claim 12 wherein said bellows engage each other.

14. The pilot operated valve of claim 12 wherein said poppet engages said body substantially only at said seat and is otherwise generally spaced from the walls of said cavity, and said bellows are spaced from said walls.

15. The pilot operated valve of claim 12 wherein said bellows are in engagement but disconnected from each other, both of said bellows having their interiors vented, one of said bellows being vented oppositely of the other.

16. The pilot operated valve of claim 15 wherein said engagement of said bellows is essentially a point contact engagement.

17. The pilot operated valve of claim 15 wherein said one bellows includes self alignment means at the location of its engagement with said poppet.

18. The pilot operated valve of claim 12 wherein said body and said rod are formed of materials having different coefficients of thermal expansion.

* * * * *